Oct. 30, 1928.

G. A. KLIMEK

POWER TRANSMITTER

Filed July 28, 1926

INVENTOR
Gustav A. Klimek
BY
ATTORNEYS

Oct. 30, 1928.
G. A. KLIMEK
POWER TRANSMITTER
Filed July 28, 1926
1,689,245
2 Sheets-Sheet 2
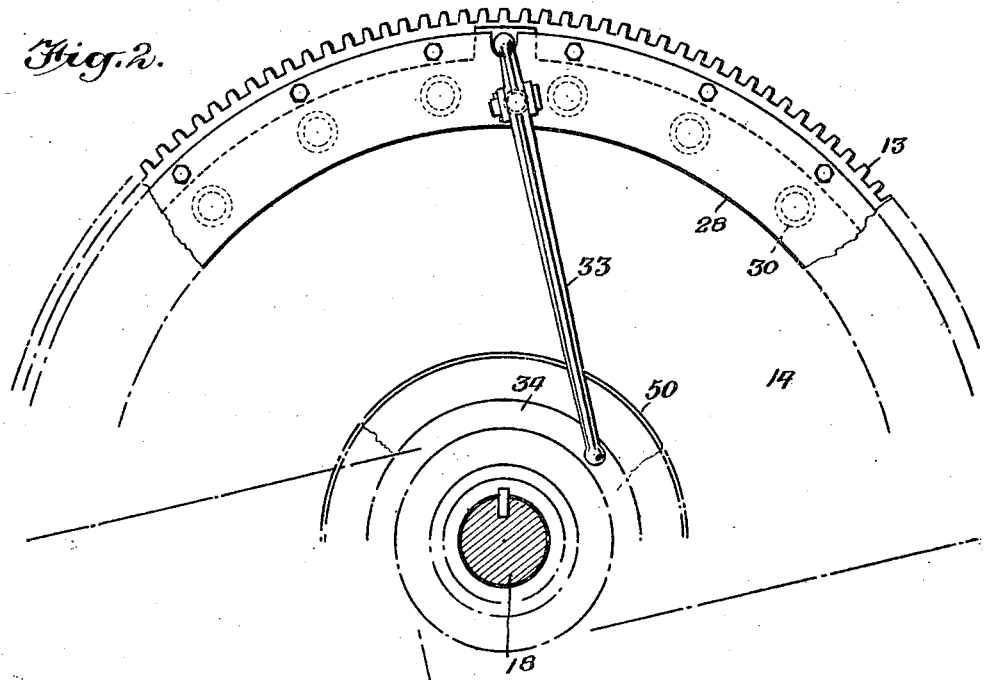
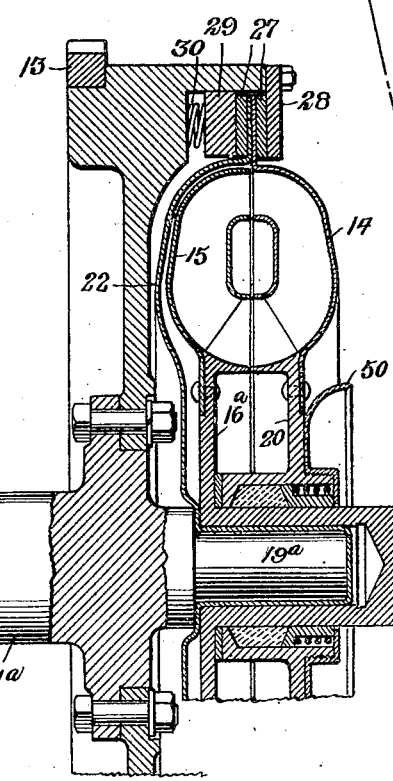
INVENTOR
Gustav A. Klimek
BY
ATTORNEYS Patented Oct. 30, 1928.

1,689,245

UNITED STATES PATENT OFFICE.

GUSTAV A. KLIMEK, OF EAST RUTHERFORD, NEW JERSEY, ASSIGNOR TO TURBINE PATENTS CORPORATION, OF NEW YORK, N. Y., A CORPORATION OF DELAWARE.

POWER TRANSMITTER.

Application filed July 28, 1926. Serial No. 125,343.

This invention relates to power transmitters of that type in which a mechanically operable clutch is connected in series with a hydraulic power transmitter of the Föttinger type, certain forms of which are shown and broadly claimed in Patent 1,199,359, dated September 26th, 1916.

Although my invention in its preferred form is particularly adapted for use in a motor vehicle for transmitting power from the engine to the main propeller shaft, it is equally applicable in various other apparatus, machines and power plants for the transmission of power from a driving to a driven shaft, particularly where either shaft is liable to be subjected to sudden speed variations. When the mechanical clutch is closed, the power is transmitted through the clutch, and the hydraulic power transmitter so that the latter serves to cushion the shock of sudden accelerating or decelerating movements of either shaft. It also serves to cushion the transmission of power at the time the clutch is brought into operation.

As one main feature of my invention I so design and so place the mechanical clutch parts in respect to the rotors of the hydraulic mechanism that the unit is of very compact form and easily operable.

As a further important object of my invention, the mechanical clutch parts are so positioned that I may employ the minimum number of such parts, operate the parts through the minimum distance, and provide the minimum torsional strains at the clutch faces.

To accomplish this object I make the clutch of the maximum diameter in respect to the diameter of the unit in which it is to be employed. This is an important advantage over any design in which the clutch is encircled by one or both of the hydraulic rotors, as has been heretofore proposed. By bringing the clutch face to the maximum distance from the axis of rotation, the full effect of a multiple disk clutch may be secured by the employment of only three clutch blades or members, and thus for a given axial movement the members are spaced to a far greater distance, and there is less drag than is the case of a multiple disk clutch of small diameter. Furthermore, the larger the clutch faces the smaller need be the pressure required for holding them together, and therefore in my improved construction the clutch may be disengaged by the application of comparatively light pressure on the clutch pedal or other operating part. Various other features of my invention will be hereinafter pointed out, or will be apparent from a consideration of the preferred embodiments illustrated in the accompanying drawings:

In these drawings:

Fig. 2 is a partial end view showing particularly the clutch operating mechanism, and Fig. 3 is a section similar to a portion of Fig. 1, but showing another form which may be employed for carrying out my invention.

Figure 1:
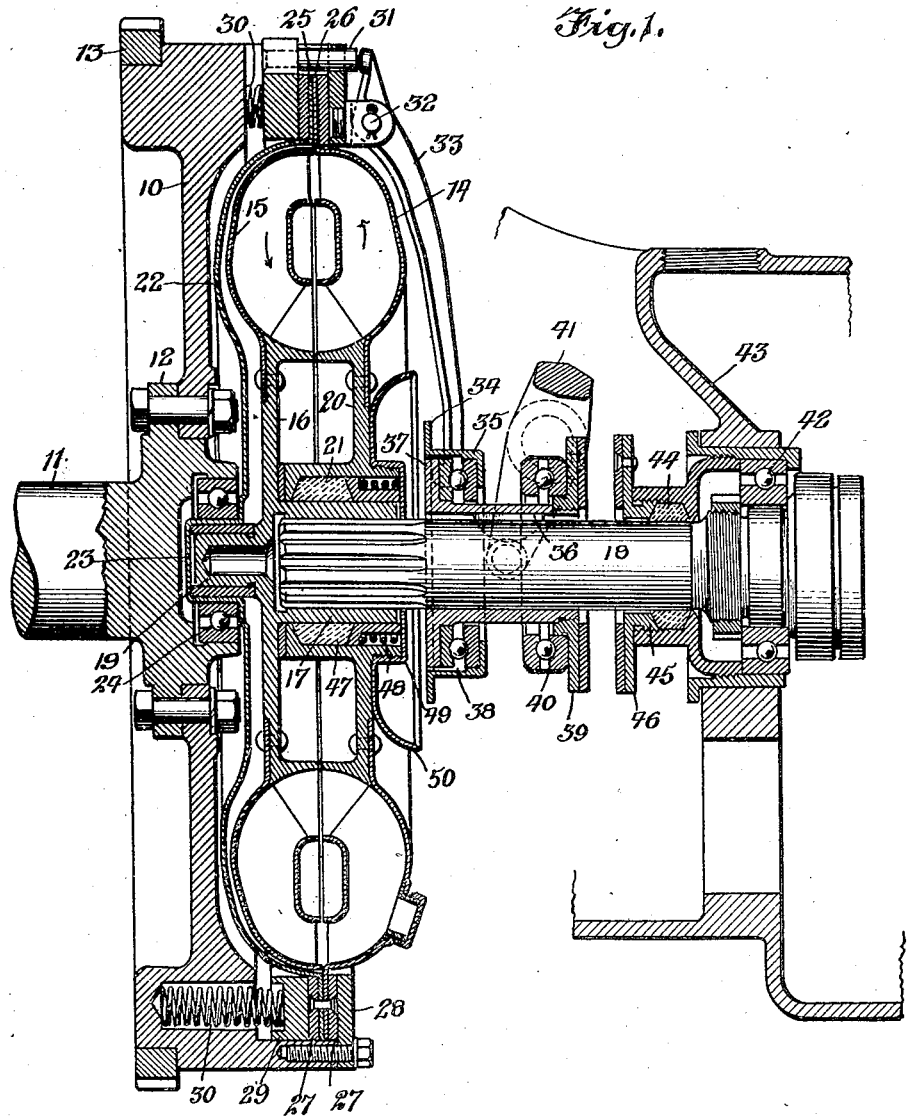
Fig. 1 is a central longitudinal section of a device embodying my invention.

In the specific construction illustrated in Figs. 1 and 2, there is provided a fly wheel 10 which may be secured in any suitable manner to one of the two shafts, for instance the drive shaft 11. This shaft is shown as having a flange 12 to which the web of the fly wheel may be secured. For use with a self-starter, the fly wheel may have a gear 13 formed integral therewith or rigidly secured thereto. In connection with this fly wheel I employ a hydraulic power transmitter which includes a centrifugal pump impeller 14 and a turbine 15. These two are each provided with fluid passages so juxtaposed that the fluid forced from the outlets of the passages of the impeller strike the blades of the turbine and cause the latter to rotate in the same direction. The turbine includes a sheet metal casing which is secured to the flange 16 of a sleeve 17 mounted on the driven shaft 18. Preferably the sleeve and shaft are so connected as to permit relative longitudinal movement but prevent relative rotary movement. The sleeve at one end has a stud 19 which projects into a socket in the end of the drive shaft 11 and is there supported by ball bearings so as to keep the sleeve and driven shaft aligned with the driving shaft 11.

The impeller 14 has a sheet metal casing which is secured to the flange 20 of a sleeve 21 which is rotatably mounted on the sleeve 17. The two flanges 16 and 20 have peripheral portions juxtaposed to complete the peripheral wall of the fluid circulating chamber of the hydraulic transmitter.

The turbine or driven member 15 of the transmitter is disposed within a casing, which casing is attached to the impeller member 14. This includes a sheet metal wall 22 disposed between the turbine member 15 and the fly wheel. At the center it has a cup portion 23 which is disposed within the ball bearing 24 and around the stud 19. It is rotatable in respect to both, as will be later pointed out.

At the periphery of the hydraulic unit the casing wall 22 has an outwardly extending flange 25 which is rigidly secured to a similar flange 26 on the periphery of the impeller. These two flanges thus unite the casing to the impeller and form a liquid-tight chamber for the operating fluid of the transmitter. The flanges also form one element of the mechanical clutch. The flanges may be reinforced by a pair of annular members 27 riveted or otherwise secured thereto, and presenting the friction faces of this clutch element.

The fly wheel 10 has an inwardly extending, detachable flange 28 which serves as a clutch face for engagement with the outer surface of one of the annular members 27 and it also has an axially movable clutch element 29 which is pressed toward the other member 27 by a series of coil springs 30. The members 28 and 29 are held against rotation in respect to the fly wheel, and serve to grip the casing of the hydraulic unit and the impeller member of said unit rigidly to the fly wheel, and cause the impeller unit to turn with the fly wheel. By forcing the member 29 against the action of the springs 30, the members 28 and 29 may be separated to permit of their free rotation, independent of the rotation of any part of the hydraulic unit.

For operating the clutch member 29 there are provided a series of pins 31 mounted for axial movement through the clutch member or flange 28. This flange has lugs 32 serving as pivotal supports for levers 33 extending in a general radial direction. The outer ends of these levers engage the pins 31, while the inner ends engage a flange 34 of a rotatable collar 35. By forcing this collar toward the right from the position shown in Fig. 1, the levers are turned so as to impart the necessary movement to the pins 31 and open the clutch. The springs 30 normally keep the parts in the position illustrated.

The mechanism for operating the collar 35 is shown as including a sleeve 36 keyed to but slidable along the shaft 18 and provided with a flange 37 spaced from the collar 35 by a thrust bearing 38. At its outer end the sleeve 36 has an outwardly extending flange 39 which carries a thrust bearing 40 spaced from the thrust bearing 38, so as to leave a groove to receive the rollers or inwardly projecting pins of a clutch lever 41. Thus, by means of this lever the sleeve 36 may be moved in either direction to apply or release the clutch.

The clutch operating mechanism is preferably provided with a suitable brake, whereby the rotation of the driven member may be retarded or stopped by the action of the clutch lever after the opening of the clutch. The shaft 18 is mounted on the ball bearings 42 in the end wall of a gear case 43, and this case is provided with a packing 44 to prevent the escape of grease. The gland member 45 is provided with a flange 46 which is spaced from and parallel to the flange 39. These two flanges are provided with suitable brake linings whereby when the clutch lever 41 is moved to disengage the clutch, the sleeve 36 may be moved through a sufficient distance to bring these brake linings together and slow down or stop the sleeve 36 and the parts which are non-rotatably connected thereto, namely the shaft 18 and the turbine member 15 of the hydraulic unit.

Between the sleeves 21 and 17 of the two elements of the hydraulic transmitter, there is provided a packing member 47 which may be held under compression by a spring 48. The collar 49 which holds this spring in position is provided with a concave flange 50, the outer edge of which is axially spaced beyond the wall of the impeller 14. Thus any lubricating oil or other fluid which may be thrown out from the shaft 18 or may work out from the packing 47, will be thrown clear of the impeller if the parts are rotating, or will drop clear of it, if they are at rest. Thus I prevent liability of oil working out along the outer surface of the impeller to the clutch members.

By reason of the large diameter of the clutch members I may employ the minimum number of such members to give the desired area of clutch surface, and by reducing the number of these clutch elements I reduce to a minimum the pressure required to hold them in operative engagement and likewise reduce to a minimum the distance through which the clutch member 29 must be moved in order to completely free the parts.

The construction illustrated in Fig. 3 is very similar in most respects to that shown in Fig. 1. The main important difference is that the flange 16$^a$ of the turbine member is connected directly to the driven shaft 18$^a$. This is splined at its outer end, rather than in the connection between it and the sleeve carrying the flange. The driving shaft 11$^a$, instead of having a socket to receive a stud on the driven shaft, is provided with a stud 19$^a$ projecting into a socket in the end of the shaft 18$^a$. The other parts may be the same, so far as the present invention is concerned.

Having thus described my invention, what I claim as new and desire to secure by Letters Patent is:

1. A power transmitter for connecting coaxial driving and driven members, including a fly wheel secured to the driving member, a hydraulic power transmitter including a centrifugal pump impeller, a turbine rotor connected to said driven member and juxtaposed to said impeller for receiving liquid directly from the latter and returning said liquid to said impeller, and a clutch encircling said hydraulic power transmitter and having a driving part secured to said fly wheel and a driven part secured to said impeller.

2. In combination a fly wheel having a pair of spaced clutch parts adjacent to the periphery thereof, and relatively movable axially, a hydraulic power transmitter, including an impeller member and a turbine member, said impeller member having a clutch part juxtaposed between said first mentioned clutch parts.

3. In combination a fly wheel having a body portion and an inwardly directed flange spaced therefrom and serving as a clutch member, an annular clutch member axially movable in respect thereto, a hydraulic power transmitter impeller having a clutch member disposed between said first mentioned clutch members, and a turbine member juxtaposed to and adapted to be driven by said impeller member.

4. In combination a fly wheel having a pair of relatively movable clutch members at the peripheral portion thereof, a hydraulic power transmitter encircled by said clutch members and including an impeller member, a casing member secured to the latter, and a turbine member disposed between said casing member and said impeller, said casing member and impeller having a clutch member projecting radially between the clutch members of said fly wheel.

5. In combination a fly wheel having a pair of relatively movable clutch members adjacent to the periphery thereof, a centrifugal pump impeller having a clutch member at its outer edge, projecting between said first mentioned clutch members, a driven shaft, and a turbine member juxtaposed to said impeller and connected to said driven shaft.

6. In combination a fly wheel having a pair of relatively movable clutch members adjacent to the periphery thereof, a centrifugal pump impeller having a clutch member at its outer edge projecting between said first mentioned clutch members, a driven shaft, a turbine member juxtaposed to said impeller and connected to said driven shaft, and means carried by said impeller member for preventing movement of liquid to and along the outer surface of said clutch members.

7. In combination a fly wheel having a clutch member adjacent to the periphery thereof, a centrifugal pump impeller having a clutch member at its periphery, a driven shaft, a turbine member juxtaposed to said impeller and connected to said driven shaft, and means for effecting the engagement or disengagement of said clutch members.

8. A power transmitter for connecting coaxial driving and driven members, including a centrifugal pump impeller, a turbine rotor connected to said driven member and juxtaposed to said impeller for receiving liquid directly from the latter and returning said liquid to said impeller, and a clutch encircling said impeller and rotor and having a driving part secured to said driving member and a driven part secured to said impeller.

Signed at Chicago, in the county of Cook and State of Illinois this 17th day of July, A. D. 1926.

GUSTAV A. KLIMEK.